United States Patent
MacArthur et al.

(10) Patent No.: US 11,555,752 B2
(45) Date of Patent: Jan. 17, 2023

(54) SYSTEMS AND METHODS OF VERIFYING THE ASSEMBLY OF A VEHICLE WIPER ASSEMBLY

(71) Applicant: Honda Motor Co., Ltd., Tokyo (JP)

(72) Inventors: Benjamin B. MacArthur, Barrie (CA); Benjamin Douglas Deboer, Ancaster (CA)

(73) Assignee: HONDA MOTOR CO., LTD., Tokyo (JP)

( * ) Notice: Subject to any disclaimer, the term of this patent is extended or adjusted under 35 U.S.C. 154(b) by 485 days.

(21) Appl. No.: 16/789,111

(22) Filed: Feb. 12, 2020

(65) Prior Publication Data
US 2021/0247253 A1 Aug. 12, 2021

(51) Int. Cl.
*G01L 5/00* (2006.01)
*G01L 25/00* (2006.01)

(52) U.S. Cl.
CPC ............ *G01L 5/0033* (2013.01); *G01L 25/00* (2013.01)

(58) Field of Classification Search
CPC .. G01N 19/02; G01M 5/0033; G01M 99/005; G01M 13/00; G01M 99/00; B60S 1/3801; B60S 1/3411; B60S 1/3459; B60S 1/18; B60S 1/34; B60S 1/0447; B60S 1/3409; B60S 1/32; B60S 1/245; B60S 1/0433; B60S 1/08; E05B 81/25
See application file for complete search history.

(56) References Cited

U.S. PATENT DOCUMENTS

| 8,151,656 | B2 | 4/2012 | Bosch | |
|---|---|---|---|---|
| 8,819,888 | B2* | 9/2014 | Iizuka | B60S 1/0433 |
| | | | | 15/250.31 |
| 9,689,756 | B2 | 6/2017 | Drake et al. | |
| 2011/0197385 | A1* | 8/2011 | Bauer | B60S 1/0447 |
| | | | | 15/250.31 |
| 2016/0250997 | A1* | 9/2016 | Toda | B60S 1/0807 |
| | | | | 701/49 |

FOREIGN PATENT DOCUMENTS

| CN | 203929903 U | 11/2014 |
|---|---|---|
| CN | 205246702 U | 5/2016 |
| CN | 206740370 U | 12/2017 |
| DE | 19525553 A1 | 1/1997 |
| KR | 100309343 B1 | 4/2002 |
| WO | 2012013395 A1 | 2/2012 |

* cited by examiner

*Primary Examiner* — Brandi N Hopkins
(74) *Attorney, Agent, or Firm* — Armstrong Teasdale LLP

(57) ABSTRACT

A vehicle wiper linkage installation verification tool that includes a stabilizing bar, a first connector at a first end of the stabilizing bar, and a second connector at a second end of the stabilizing bar. The first connector and the second connector are engageable with wiper posts of a wiper assembly. A pulling tool is coupled to the stabilizing bar, wherein the pulling tool is engageable with a linkage arm of the wiper assembly, and is configured to pull the linkage arm toward the stabilizing bar.

20 Claims, 5 Drawing Sheets

SYSTEMS AND METHODS OF VERIFYING THE ASSEMBLY OF A VEHICLE WIPER ASSEMBLY

BACKGROUND

The present disclosure relates generally to windshield wiper systems and, more specifically, to systems and methods for verifying the assembly of a wiper system within a vehicle.

Conventionally, a vehicle such as an automobile is equipped with a wiper system, which wipes off rainwater and dust, for example, that collects on a windshield of the vehicle to ensure the view of a driver through the windshield is unobstructed. Known wiper systems typically include at least one linkage arm that is rotatably driven by a drive system including a motor, wiper posts extending from the linkage arm, wiper arms coupled to the wiper posts, and a wiper blade attached to each wiper arm. The motor, the linkage arm, and the wiper arms are formed as separate parts and coupled together with fasteners. The wiper system may be delivered to a vehicle manufacturer in a pre-assembled state, or may be assembled within the vehicle on-site. Due to the importance of the wiper system on the ability of a driver to operate the vehicle, many manufacturers perform an inspection on the wiper system to verify it has been properly and securely assembled within the vehicle. However, such inspections are typically manual inspections, which can be laborious and time-consuming, and may be prone to human error and subjectivity.

BRIEF DESCRIPTION

In one aspect, a vehicle wiper linkage installation verification tool is provided. The tool includes a stabilizing bar, a first connector at a first end of the stabilizing bar, and a second connector at a second end of the stabilizing bar. The first connector and the second connector are engageable with wiper posts of a wiper assembly. A pulling tool is coupled to the stabilizing bar, wherein the pulling tool is engageable with a linkage arm of the wiper assembly, and is configured to pull the linkage arm toward the stabilizing bar.

In another aspect, a vehicle wiper installation verification system is provided. The system includes a verification tool comprising a stabilizing bar, a first connector at a first end of the stabilizing bar, and a second connector at a second end of the stabilizing bar. The first connector and the second connector are engageable with wiper posts of a wiper assembly. A pulling tool is coupled to the stabilizing bar, wherein the pulling tool is engageable with a linkage arm of the wiper assembly, and is configured to pull the linkage arm towards the stabilizing bar. The system also includes a torque tool removably coupled to the pulling tool, wherein the torque tool is configured to actuate the pulling tool for pulling the linkage arm toward the stabilizing bar.

In yet another aspect, a method of verifying installation of a wiper assembly within a vehicle is provided. The method includes coupling a verification tool to the wiper assembly. The verification tool includes a stabilizing bar, a first connector at a first end of the stabilizing bar, and a second connector at a second end of the stabilizing bar. The first connector and the second connector are coupled to wiper posts of the wiper assembly. The verification tool also includes a pulling tool coupled to the stabilizing bar, wherein the pulling tool is coupled to a linkage arm of the wiper assembly. The method also includes pulling, with the pulling tool, the linkage arm toward the stabilizing bar, monitoring an amount of force applied to the linkage arm by the pulling tool, and comparing the amount of force to a predetermined force to verify installation of the linkage arm within the wiper assembly.

DETAILED DESCRIPTION

The embodiments described herein relate generally to systems and methods for verifying the assembly of a wiper system within a vehicle. The wiper system may be assembled within and/or coupled to the vehicle and a verification operation may then be performed on the wiper system. For example, in the exemplary embodiment, the systems described herein include a verification tool that is removably coupleable to the wiper system. The verification tool may be coupled to the wiper system, such as to wiper posts of the wiper system. The verification tool may include a stabilizing bar extending between the coupling points, and a pulling tool coupled to the stabilizing bar. When the verification tool is coupled to the wiper system, the pulling tool is positioned to extend between the stabilizing bar and a linkage arm of the wiper system.

In operation, the pulling tool pulls the linkage arm towards the stabilizing bar in accordance with a programmed verification operation, which includes pulling the linkage arm with an increased pulling force until a predetermined force is applied to the linkage arm by the pulling tool. The applied force is measured. Reaching the predetermined force is an indication that the wiper system is securely assembled within the vehicle. If the predetermined force cannot be reached, it can be determined that an error in the assembly of the wiper system is present. The verification operation may be performed by an electronically controllable torque tool, which is coupled to the pulling tool to facilitate actuation thereof. Accordingly, the verification operation is performable in a repeatable and predictable manner. In addition, the torque tool may record and then link test result data to particular vehicles tested, thereby enabling test results to be traced to a particular vehicle.

Figure 1:
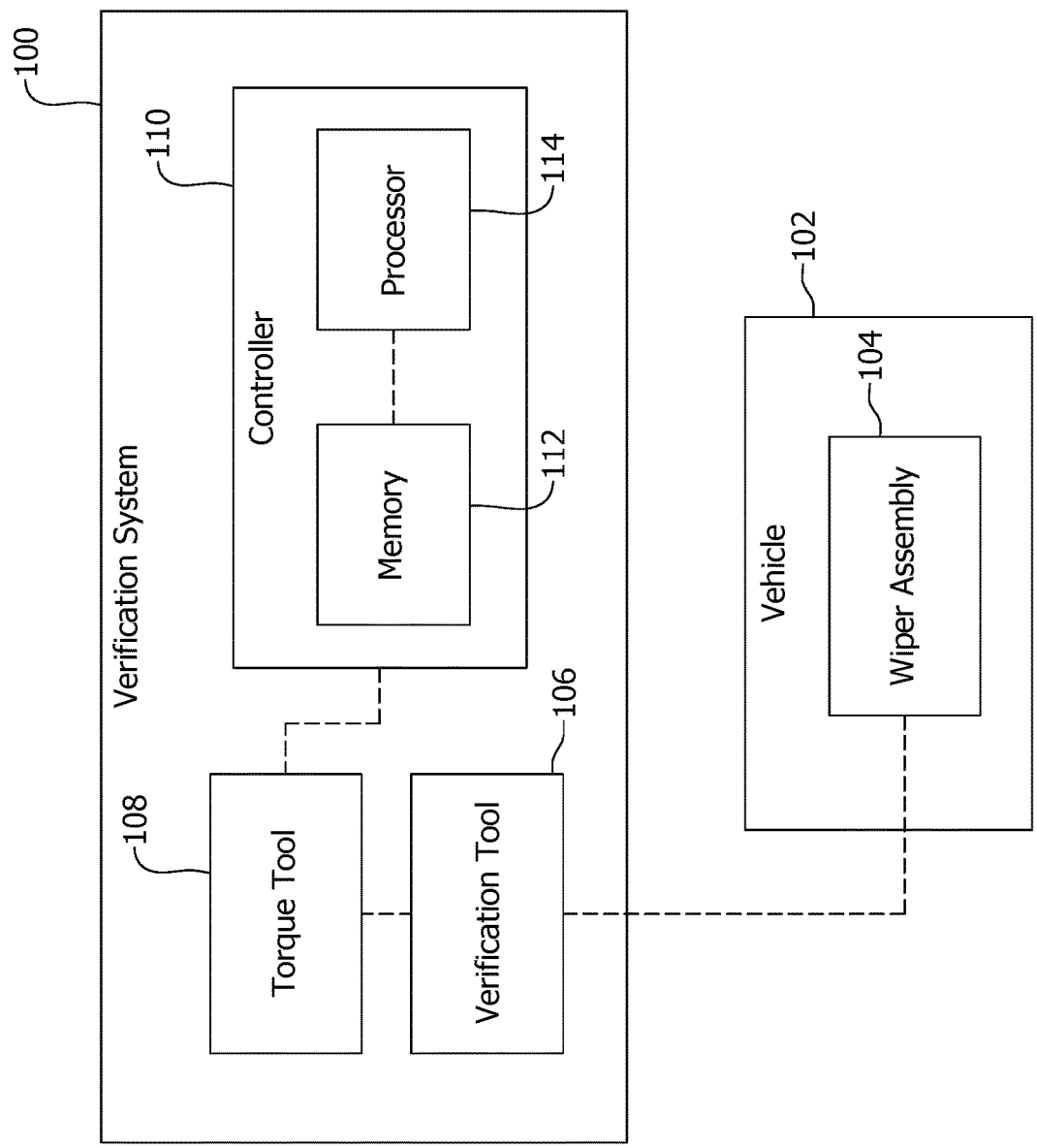
FIG. 1 is a block diagram illustrating an exemplary vehicle wiper installation verification system.

FIG. 1 is a block diagram illustrating an exemplary vehicle wiper installation verification system 100. In the exemplary embodiment, a vehicle 102 includes a wiper assembly 104 installed therein, and verification system 100 may be used to inspect wiper assembly 104 to verify wiper assembly 104 is securely assembled within vehicle 102. Alternatively, wiper assembly 104 may be inspected before being installed within vehicle 102. For example, verification system 100 includes a verification tool 106, a torque tool 108 selectively coupleable to verification tool 106, and a controller 110 communicable with torque tool 108 to facilitate controlling operation of torque tool 108, and to receive feedback from torque tool 108.

Controller 110 includes a memory 112 (i.e., a non-transitory computer-readable medium) and a processor 114 coupled to memory 112 for executing programmed instructions. Processor 114 may include one or more processing units (e.g., in a multi-core configuration) and/or include a cryptographic accelerator (not shown). Controller 110 is programmable to perform one or more operations described herein by programming memory 112 and/or processor 114. For example, processor 114 may be programmed by encoding an operation as executable instructions and providing the executable instructions in memory 112.

Processor 114 may include, but is not limited to, a general purpose central processing unit (CPU), a microcontroller, a reduced instruction set computer (RISC) processor, an open media application platform (OMAP), an application specific integrated circuit (ASIC), a programmable logic circuit (PLC), and/or any other circuit or processor capable of executing the functions described herein. The methods described herein may be encoded as executable instructions embodied in a computer-readable medium including, without limitation, a storage device and/or a memory device. Such instructions, when executed by processor 114, cause processor 114 to perform at least a portion of the functions described herein. The above examples are exemplary only, and thus are not intended to limit in any way the definition and/or meaning of the term processor.

Memory 112 is one or more devices that enable information such as executable instructions and/or other data to be stored and retrieved. Memory 112 may include one or more computer-readable media, such as, without limitation, dynamic random access memory (DRAM), synchronous dynamic random access memory (SDRAM), static random access memory (SRAM), a solid state disk, and/or a hard disk. Memory 112 may be configured to store, without limitation, executable instructions, operating systems, applications, resources, installation scripts and/or any other type of data suitable for use with the methods and systems described herein.

Instructions for operating systems and applications are located in a functional form on non-transitory memory 112 for execution by processor 114 to perform one or more of the processes described herein. These instructions in the different implementations may be embodied on different physical or tangible computer-readable media, such as memory 112 or another memory, such as a computer-readable media (not shown), which may include, without limitation, a flash drive and/or thumb drive. Further, instructions may be located in a functional form on non-transitory computer-readable media, which may include, without limitation, smart-media (SM) memory, compact flash (CF) memory, secure digital (SD) memory, memory stick (MS) memory, multimedia card (MMC) memory, embedded-multimedia card (e-MMC), and micro-drive memory. The computer-readable media may be selectively insertable and/or removable from controller 110 to permit access and/or execution by processor 114. In an alternative implementation, the computer-readable media is not removable.

Figure 2:
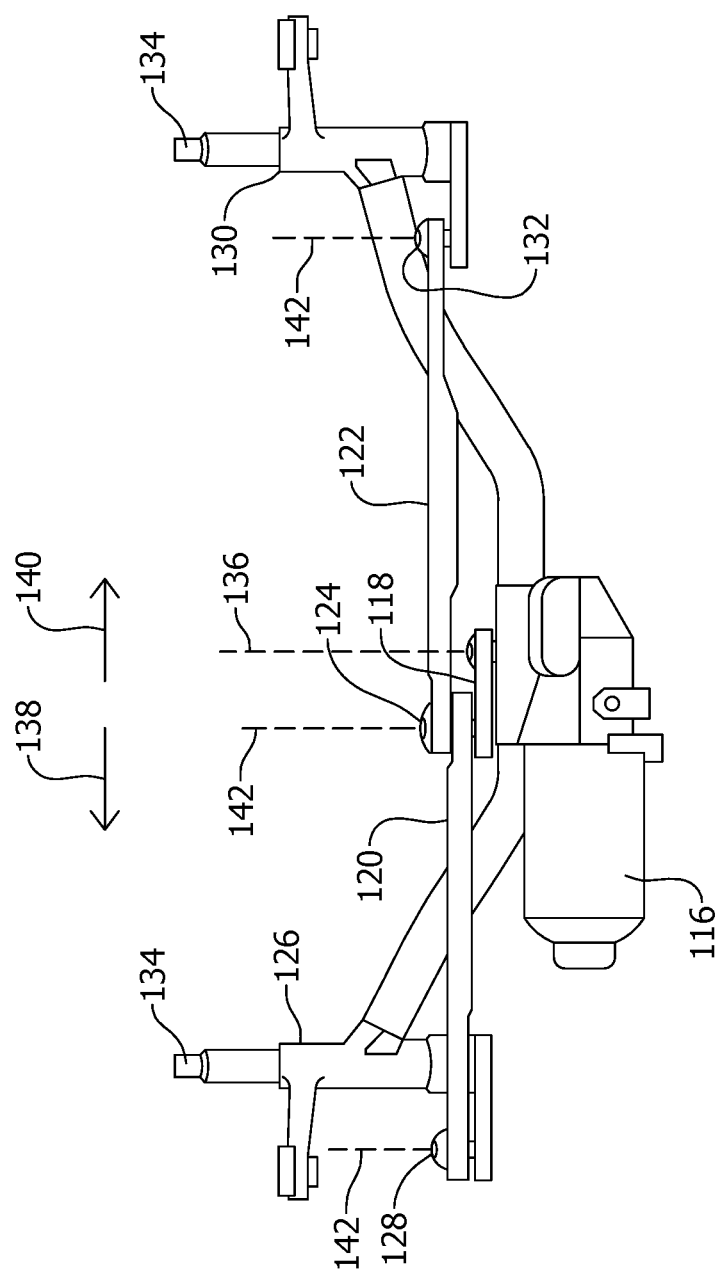
FIG. 2 is an illustration of an exemplary wiper assembly that may be used in a vehicle.

FIG. 2 is an illustration of an exemplary wiper assembly 104 that may be used in vehicle 102 (shown in FIG. 1). In the exemplary embodiment, wiper assembly 104 includes a motor 116 and a rotatable member 118 coupled to motor 116. Wiper assembly 104 also includes a first linkage arm 120 and a second linkage arm 122 coupled to rotatable member 118 with a first fastener 124. First linkage arm 120 and second linkage arm 122 extend from rotatable member 118, a first wiper post 126 is coupled to first linkage arm 120 with a second fastener 128, and a second wiper post 130 is coupled to second linkage arm 122 with a third fastener 132. Wiper posts 126 and 130 each include a threaded end 134 for receiving a wiper arm (not shown) thereon. In operation, motor 116 rotates rotatable member 118 relative to a rotation axis 136, which causes first linkage arm 120 and second linkage arm 122 to move in a first direction 138 and a second direction 140 in a reciprocal motion. Movement of linkage arms 120 and 122 causes rotation of wiper posts 126 and 130, and actuation of respective wiper arms.

In the exemplary embodiment, fasteners 124, 128, and 132 enable respective parts coupled thereto to freely rotate about each fastener 124, 128, and 132. To facilitate the rotatable and reciprocal motion of wiper assembly 104, each fastener 124, 128, and 132 is oriented to extend along an installation axis 142 that is substantially parallel with rotation axis 136. For example, fastener 124 may include a post and/or a clip extending from rotatable member 118 and extending through openings defined within first linkage arm 120 and second linkage arm 122. The post and/or clip may include a locking feature that secures first linkage arm 120, second linkage arm 122, and rotatable member 118 together when the parts are pressed together with sufficient force. The post and/or clip provides what may be referred to as a press fit, a snap fit, and/or may include a retaining feature that expands to a locking position when pressed entirely through an opening. Alternatively, fasteners 124, 128, and 132 may include any other type of fastener that provides a secure connection between wiper assembly component. In order for fasteners 124, 128, and 132 to be properly fastened, force sufficient to seat the fasteners properly needs to be applied to the fasteners and/or parts being fastened together. This force is typically applied by hand, or by a technician using a hand tool. Accordingly, as will be described in more detail below, inspecting wiper assembly 104 for the securement of fasteners 124, 128, and 132 includes applying a pulling force to linkage arms 120 or 122, for example, in a direction oriented with installation axis 142. Applying the pulling force is a test to determine if the fasteners are secured properly.

Figure 3:
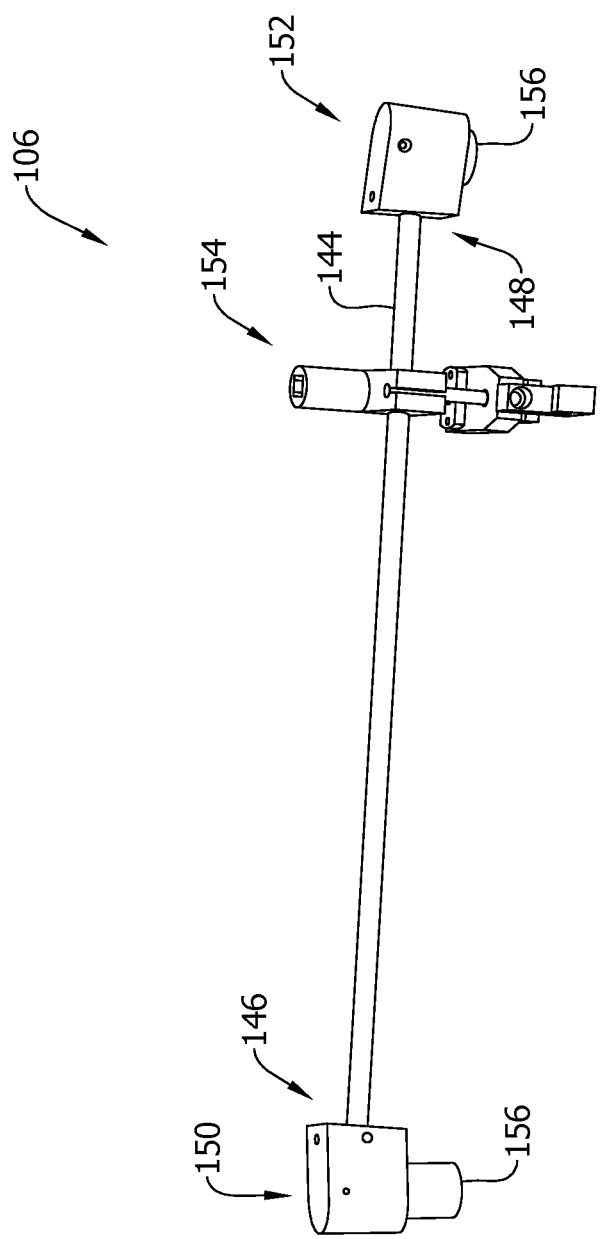
FIG. 3 is an illustration of an exemplary embodiment of a verification tool that may be used to verify proper installation of the wiper assembly shown in FIG. 2.

FIG. 3 is an illustration of an exemplary verification tool 106 that may be used on wiper assembly 104 (shown in FIG. 2). In the exemplary embodiment, verification tool 106 includes a stabilizing bar 144 having a first end 146 and a second end 148. A first connector 150 is at first end 146 of stabilizing bar 144, and a second connector 152 is at second end 148 of stabilizing bar 144. A pulling tool 154 is coupled to stabilizing bar 144. When verification tool 106 is installed on wiper assembly 104 for performing a verification operation, first connector 150 is coupled to first wiper post 126 (shown in FIG. 2), and second connector 152 is coupled to second wiper post 130 (shown in FIG. 2). In one embodiment, stabilizing bar 144 is selectively extendible and retractable to modify a distance between first connector 150 and second connector 152. For example, stabilizing bar 144 may be a multi-part and/or telescoping assembly. Accordingly, the length of verification tool 106 is adjustable to enable inspection of vehicles having wiper posts 126 and 130 spaced apart by different distances from each other.

First and second connectors 150 and 152 may be threadably engaged with threaded ends 134 (shown in FIG. 2) of wiper posts 126 and 130. Alternatively, first and second connectors 150 and 152 may each have an opening (not shown) defined therein for receiving threaded ends 134 with a clearance fit. Pulling tool 154 may be coupled to one of linkage arms 120 and 122 (shown in FIG. 2) to stabilize verification tool 106 on wiper assembly 104. In addition, each connector 150 and 152 includes a protective insert 156 coupled thereto, which is positionable to engage wiper posts 126 and 130 when verification tool 106 is positioned on wiper assembly 104. Protective insert 156 is made of any material that enables verification tool 106 to function as described herein. For example, protective insert 156 is made of a material for limiting damage to wiper posts 126 and 130 when connectors 150 and 152 are coupled thereto. An example protective insert material includes, but is not limited to, a nylon material and a polyoxymethylene material.

Figure 4:
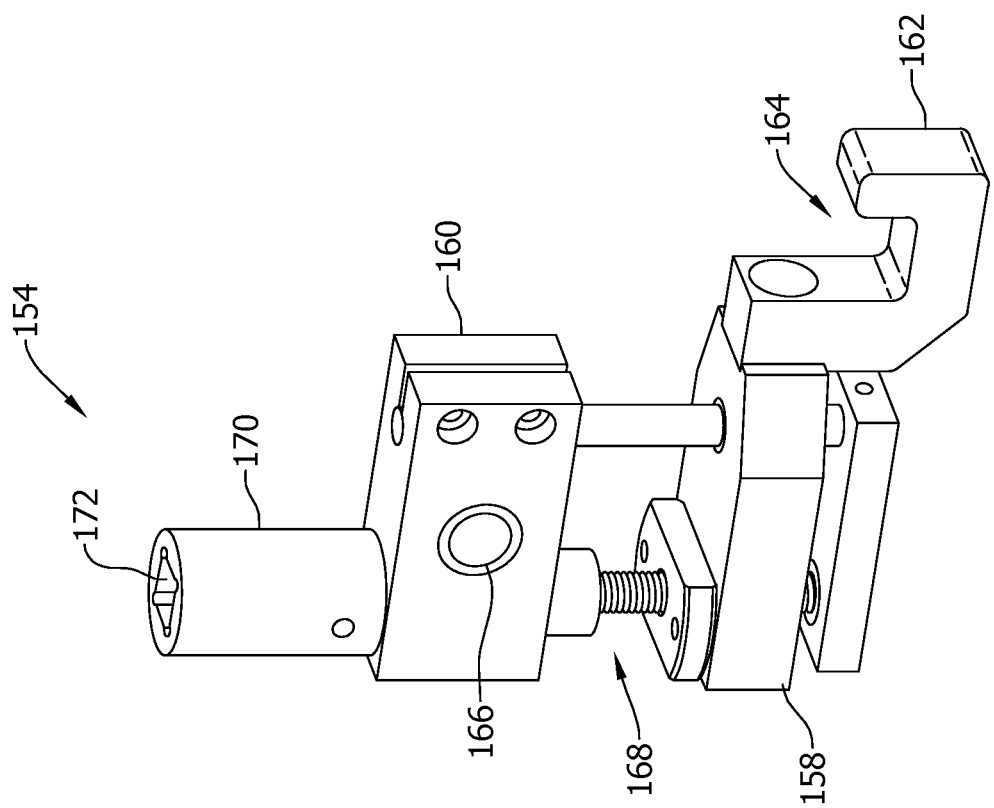
FIG. 4 is a perspective view of an exemplary pulling tool that may be included in the verification tool shown in FIG. 3.
Figure 5:
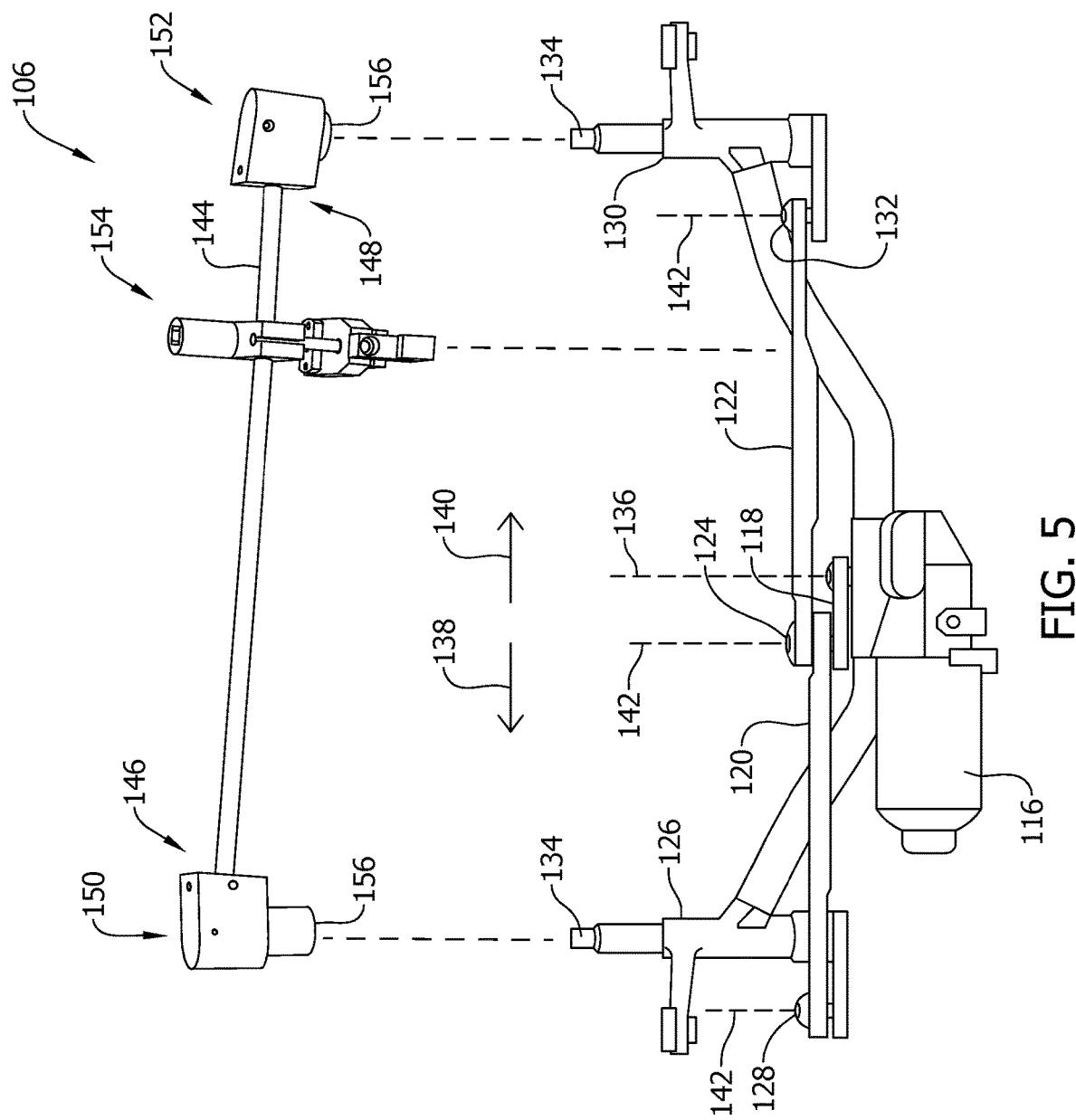
FIG. 5 is an illustration of the exemplary wiper assembly shown in FIG. 2 and the exemplary embodiment of the verification tool shown in FIG. 3.

Referring to FIG. 4, pulling tool 154 includes a first pulling member 158 and a second pulling member 160 spaced from each other. A hook member 162 is coupled to first pulling member 158. Hook member 162 is defined by a slot 164 designed to receive one of linkage arms 120 and 122 (shown in FIG. 2) when a verification operation is performed. Hook member 162 is made of any material that enables verification tool 106 to function as described herein. For example, hook member 162 is made of a material having characteristics that limit damage to linkage arms 120 and 122 when hook member 162 is coupled thereto. An example hook member material includes, but is not limited to, a nylon material and a polyoxymethylene material.

Second pulling member 160 includes a through hole 166 defined therein. Through hole 166 is sized to enable stabilizing bar 144 (shown in FIG. 3) to be insertable therethrough. Accordingly, pulling tool 154 is translatable along stabilizing bar 144 between first and second connectors 150 and 152 (shown in FIG. 3). Translating pulling tool 154 along stabilizing bar 144 enables the verification operation to be performed at different locations along each linkage arm 120 and 122, and thus enables the installation of each fastener 124, 128, and 132 (shown in FIG. 2) to be inspected.

In the exemplary embodiment, pulling tool 154 also includes an actuator 168 that selectively translates first and second pulling members 158 and 160 relative to each other. For example, actuator 168 may be a ball screw linear actuator that facilitates translating first and second pulling members 158 and 160 via rotational actuation. For example, rotating actuator 168 in a first rotational direction facilitates increasing a distance between pulling members 158 and 160, and rotating actuator 168 in an opposite second rotational direction facilitates decreasing the distance. The rotational actuation may be effectuated by a tool connector 170 coupled, and rotatable relative, to second pulling member 160. Tool connector 170 includes a tool opening 172 designed engage torque tool 108 (shown in FIG. 1). Accordingly, torque tool 108 may be used to actuate pulling tool 154 for translating first and second pulling members 158 and 160 relative to each other.

Referring again to FIG. 1, in one embodiment, the verification operation is programmed into memory 112 for execution by processor 114 of controller 110. For example, in operation, verification tool 106 may be coupled to wiper assembly 104 as described above, with each connector 150 and 152 (shown in FIG. 3) coupled to respective wiper posts 126 and 130 (shown in FIG. 2), and with hook member 162 (shown in FIG. 4) coupled to first linkage arm 120 (shown in FIG. 2), for example. Torque tool 108 may then be coupled to pulling tool 154, and the programmed verification operation executed to facilitate pulling first linkage arm 120 towards stabilizing bar 144. For example, torque tool 108 pulls linkage arms 120 or 122 by rotating actuator 168 (shown in FIG. 4) in the second rotational direction to decrease a distance between first and second pulling members 158 and 160 (shown in FIG. 4), thereby pulling linkage arms 120 or 122 towards stabilizing bar 144. Continuing rotation of actuator 168 facilitates pulling linkage arms 120 or 122 with an increased pulling force.

In one embodiment, torque tool 108 is a transducerized direct current (DC) tool. Accordingly, torque tool 108 may be configured to receive and/or monitor feedback as the verification operation is performed. For example, torque tool 108 may monitor an amount of force applied to linkage arms 120 or 122 by pulling tool 154, and may monitor a number of revolutions executed by torque tool 108 throughout performance of the programmed verification operation. Verification of whether or not fasteners 124, 128, and 132 are secured within wiper assembly 104 within specified tolerances is based on the amount of force applied and the number of revolutions required to achieve a predetermined force.

For example, it can be verified that fasteners 124, 128, and 132 are secured, and that linkage arms 120 or 122 are properly installed, when the increased pulling force reaches the predetermined force within a preset number of revolutions of torque tool 108. Torque tool 108 may be programmed to execute the preset number of revolutions during performance of the verification operation. The preset number of revolutions is selected to tension fasteners 124, 128, and 132 and linkage arms 120 and 122 with a pulling force that will not cause disassembly of an otherwise securely assembled wiper assembly 104. If fasteners 124, 128, and 132 are secured, the pulling force induced by pulling tool 154 and monitored by torque tool 108 will increase as fasteners 124, 128, and 132 and linkage arms 120 and 122 are held in tension against each other. In contrast, if fasteners 124, 128, and 132 are not secured, applying the pulling force will cause at least partial disassembly of wiper assembly 104, thereby preventing the predetermined force to be reached regardless of the number of revolutions performed by pulling tool 154. The predetermined force is selected to be greater than an amount of force capable of separating unsecured fasteners from respective linkage arms. Accordingly, it can be determined that fasteners 124, 128, and 132 are not secured when the predetermined force has not been reached within the preset number of revolutions.

The embodiments described herein relate to systems and methods for verifying a wiper system is securely assembled within a vehicle. In operation, a pulling tool pulls a linkage arm of the wiper system in accordance with a programmed verification operation, which includes pulling the linkage arm with an increased pulling force until a predetermined force is applied to the linkage arm by the pulling tool. If the predetermined force is reached, it can be verified that the wiper system is securely assembled within the vehicle. If the predetermined force cannot be reached, it can be determined that an error in the assembly of the wiper system is present. The verification operation may be performed by an electronically controllable torque tool, which is coupled to the pulling tool to facilitate actuation thereof. Accordingly, the verification operation is performable in a repeatable and predictable manner.

Exemplary embodiments of a wiper installation verification system are described above in detail. Although the systems herein are described and illustrated in association with wiper system installation, the invention is also intended for use in verifying assembly of any mechanical device including multiple components fastened to each other. Moreover, it should also be noted that the components of the invention are not limited to the specific embodiments described herein, but rather, aspects of each component may be utilized independently and separately from other components and methods described herein.

This written description uses examples to disclose various embodiments, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A verification tool for use in determining if a vehicle wiper is securely assembled, the verification tool comprising:
   a stabilizing bar extending between a first end and an opposite second end along a longitudinal axis;
   a first connector at the first end of the stabilizing bar, and a second connector at the second end of the stabilizing bar, wherein the first connector and the second connector are removably engageable with wiper posts of a wiper assembly; and
   a pulling tool coupled to the stabilizing bar, wherein the pulling tool is engageable with a linkage arm of the wiper assembly, and is configured to pull the linkage arm toward the stabilizing bar along a direction that is substantially perpendicular to the stabilizing bar longitudinal axis, wherein the verification tool is removed from the wiper assembly after the pulling tool pulls on the linkage arm.

2. The tool in accordance with claim 1, wherein the pulling tool comprises:
   a first pulling member and a second pulling member spaced from each other;
   an actuator configured to selectively translate the first pulling member relative to the second pulling member; and
   a hook member coupled to the first pulling member, wherein the hook member is engageable with the linkage arm.

3. The tool in accordance with claim 2, wherein the pulling tool further comprises a tool connector operably coupled to the actuator for driving the actuator.

4. The tool in accordance with claim 2, wherein the actuator comprises a ball screw linear actuator.

5. The tool in accordance with claim 1, wherein the pulling tool is translatable along the stabilizing bar between the first connector and the second connector.

6. The tool in accordance with claim 1, wherein the stabilizing bar is selectively extendible and retractable to modify a distance between the first connector and the second connector.

7. A verification system for determining if a wiper assembly is securely assembled, the verification system comprising:
   a verification tool comprising:
      a stabilizing bar extending between a first end and an opposite second end along a longitudinal axis;
      a first connector at the first end of the stabilizing bar, and a second connector at the second end of the stabilizing bar, wherein the first connector and the second connector are removably engageable with wiper posts of a wiper assembly; and
      a pulling tool coupled to the stabilizing bar, wherein the pulling tool is engageable with a linkage arm of the wiper assembly, and is configured to pull the linkage arm towards the stabilizing bar in a direction that is substantially perpendicular to the stabilizing bar longitudinal axis; and
   a torque tool removably coupled to the pulling tool, wherein the torque tool is configured to actuate the pulling tool for pulling the linkage arm toward the stabilizing bar, wherein the verification tool is removed from the wiper assembly after the pulling tool pulls on the linkage arm.

8. The system in accordance with claim 7 further comprising a controller configured to direct the torque tool to perform a programmed verification operation that includes pulling the linkage arm towards the stabilizing bar with an increased pulling force until a predetermined force is applied to the linkage arm by the pulling tool.

9. The system in accordance with claim 8, wherein the controller is further configured to:
   determine that the linkage arm is securely assembled within the wiper assembly when the increased pulling force reaches predetermined force; and
   determine the linkage arm is not securely assembled within the wiper assembly when the predetermined force has not been reached within a preset number of revolutions of the torque tool.

10. The system in accordance with claim 7, wherein the pulling tool comprises:
    a first pulling member and a second pulling member spaced from each other;
    an actuator configured to selectively translate the first and second pulling members relative to each other; and
    a hook member coupled to the first pulling member, wherein the hook member is engageable with the linkage arm.

11. The system in accordance with claim 10, wherein the pulling tool further comprises a tool connector coupled to the second pulling member, and coupled to the actuator for driving the actuator.

12. The system in accordance with claim 10, wherein the actuator comprises a ball screw linear actuator.

13. The system in accordance with claim 7, wherein the pulling tool is translatable along the stabilizing bar between the first connector and the second connector.

14. The system in accordance with claim 7, wherein the stabilizing bar is selectively extendible and retractable to modify a distance between the first connector and the second connector.

15. A verification method for determining if a wiper assembly is securely assembled, the method comprising:
    removably coupling a verification tool to the wiper assembly, the verification tool including:
       a stabilizing bar extending between a first end and an opposite second end along a longitudinal axis;
       a first connector at the first end of the stabilizing bar, and a second connector at the second end of the stabilizing bar, wherein the first connector and the second connector are coupled to wiper posts of the wiper assembly; and
       a pulling tool coupled to the stabilizing bar, wherein the pulling tool is coupled to a linkage arm of the wiper assembly;
    positioning the pulling tool at a first position on the stabilizing bar;

pulling, with the pulling tool, the linkage arm toward the stabilizing bar along a direction that is substantially perpendicular to the stabilizing bar longitudinal axis;

monitoring an amount of force applied to the linkage arm by the pulling tool;

comparing the amount of force to a predetermined force to determine if the linkage arm is securely assembled within the wiper assembly; and removing the verification tool from the wiper assembly after the comparison.

16. The method in accordance with claim 15 further comprising:

pulling the linkage arm with an increased pulling force; and determine that the linkage arm is securely assembled within the wiper assembly when the increased pulling force reaches the predetermined force.

17. The method in accordance with claim 15, wherein pulling the linkage arm comprises:

using a torque tool to actuate the pulling tool, wherein the torque tool is configured to perform a programmed verification operation; and monitoring a number of revolutions executed by the torque tool throughout performance of the programmed verification operation.

18. The method in accordance with claim 17 further comprising:

determining the linkage arm is not securely assembled within the wiper assembly when the predetermined force has not been reached within a preset number of revolutions of the torque tool determining the linkage arm is securely assembled within the wiper assembly when the predetermined force is reached.

19. The method in accordance with claim 15, further comprising positioning the pulling tool at a second position, different than the first position, on the stabilizing bar, and wherein pulling the linkage arm comprises pulling the linkage arm from different pulling locations corresponding to different locations of the pulling tool on the stabilizing bar.

20. The method in accordance claim 15 further comprising generating and storing wiper installation verification data.

* * * * *